United States Patent [19]
Dixon

[11] 3,751,819
[45] Aug. 14, 1973

[54] DEVICE FOR INDICATING SLOPE OF GREEN ON GOLF COURSE

[76] Inventor: Harry F. Dixon, L-1 Atlantic St., Durham, N.C. 27707

[22] Filed: May 14, 1971

[21] Appl. No.: 143,546

[52] U.S. Cl. ............................... 33/389, 33/334
[51] Int. Cl. ............................................. G01c 9/24
[58] Field of Search ................. 33/333, 334, 141.5, 33/354, 336, 370, 371, 389, 390, 379

[56] References Cited
UNITED STATES PATENTS

| | | | |
|---|---|---|---|
| 897,045 | 8/1908 | Young | 33/141.5 |
| 1,898,162 | 2/1933 | Bair | 33/370 |
| 3,306,618 | 2/1967 | Liljequist | 33/334 |
| 2,976,046 | 3/1961 | McCullough | 33/334 |

*Primary Examiner*—Louis R. Prince
*Assistant Examiner*—Dennis A. Dearing
*Attorney*—B. B. Olive

[57] ABSTRACT

A device to be carried by a golfer for indicating during putting the slope of a golf course green incorporates a bubble type level supported on a wheeled structure secured to a handle. The level bubble is referenced to appropriate index marks so as to indicate the relative pitch or slope of the green during putting.

2 Claims, 6 Drawing Figures

PATENTED AUG 14 1973
3,751,819
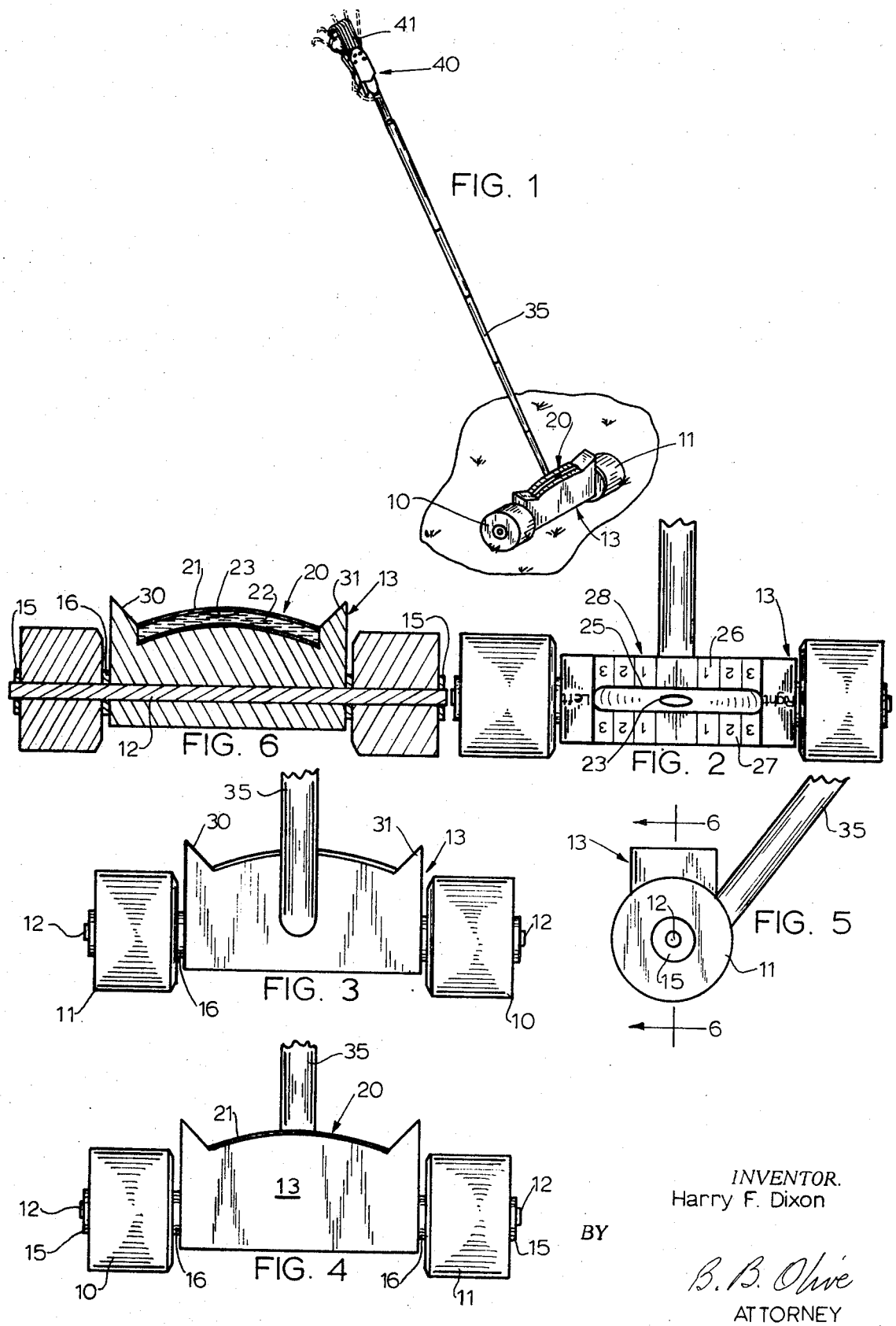
INVENTOR.
Harry F. Dixon
BY
B. B. Olive
ATTORNEY

DEVICE FOR INDICATING SLOPE OF GREEN ON GOLF COURSE

BACKGROUND OF THE INVENTION

1. Field of the Invention

This invention generally relates to devices for determining the relative slope or pitch of a surface. While adapted to other uses, the invention is particularly concerned with a device for determining the relative slope or pitch of a green on a golf course.

2. Description of the Prior Art

One of the most difficult problesm for the golfer during putting is to accurately estimate and allow for the slope or pitch of the green between the ball position and the cup. Aside from visual observation of slope, it has previously been proposed to incorporate a level as part of a golf club and a representative prior art patent of this type is found in U.S. Pat. No. 2,919,491. This type of measuring device however is awkward to use and does not lend itself very well to the variety of green surfaces encountered in golf. Therefore, it can accurately be said that the prior art has not provided a practical, lightweight device which can be carried in the golf bag along with the clubs and which, when needed, can be employed quickly and in a simple manner to indicate the slope of the golf green.

DESCRIPTION OF THE DRAWINGS

FIG. 1 is a perspective view of an apparatus incorporating the invention.

FIG. 2 is a partial top plan view of the device of FIG. 1.

FIG. 3 is a partial rear elevation view of the device of FIG. 1.

FIG. 4 is a partial front elevation view of the device of FIG. 1.

FIG. 5 is a partial side elevation view of the device of FIG. 1.

FIG. 6 is a section view taken along the line 6—6 of FIG. 5.

DESCRIPTION OF THE PREFERRED EMBODIMENTS

As shown in the drawings a pair of wheels 10, 11 are supported on an axle 12 which extends through a level mounting block 13. End caps 15 retain wheels 10, 11 on axle 12 and spacer washers 16 space the respective wheels from the sides of level mounting block 13.

The upper surface of level mounting block 13 is itself curved and mounts a bubble type level 20 of corresponding curvature and having a casing 21 and an appropriate fluid 22 in which is formed the levelling bubble 23. Case 21 is mounted in a mating curved groove 25 provided in the curved upper and laterally extending surface of level support block 13. On each side of level 20 the curved surfaces 26, 27 match with the general curvature of level 20. In order to indicate the relative position of bubble 23 suitable index marks 28 (best shown in FIG. 2) are provided on each side of the central "zero" position of bubble 23 and on each of the curved surfaces 26, 27. While other types of indicia could be employed it has been found that the simple 1-2-3 designation indicated in an outwardly increasing array gives sufficient accuracy to guide the golfer during putting. Protection from accidental lateral blows that might otherwise strike the case 22, is provided by the upstanding side projections 30, 31. These surfaces also bear the designations "Left" and "Right" for additional guidance.

A handle 35 is suitable secured to level support block 13 and is of sufficient length so that the device may be usd while the golfer is in a normal upright walking position. The central "level" or zero position of bubble 23 aligns with the axis of handle 35 and the axis of level 20 can be seen to be generally perpendicular to the axis of handle 35.

While the primary purpose of the invention is that of providing a means for determining the slope of the green between a ball position and a cup posiion during putting, the invention may have a multi-purpose function as best illustrated in FIG. 1. Here it will be noted that a conventional "Scoop-n-Rake" type ball retriever 40 is mounted on the end of handle 35 and includes the conventional spreadable fingers 41. With this embodiment the golfer is of course able to carry a single device which performs both the ball retrieving function as well as the golf level measuring function.

In use it will be understood that the golfer rolls the device of the invention between the appropriate ball position and the cup position on the green and along a direct line of travel. By observing the relative bubble position with reference to the indica marks shown in FIG. 2 the golfer thus quickly determines the degree of slope or pitch which will be acting on the ball. With a modest amount of experience the golfer quickly learns how much "left roll" or "right roll" to allow for, say, a "one," "two" or "three" amount of slope. The golfer thereby gains substantially more satisfaction from his game and gains a new kind of satisfaction in interpreting the readings of the device of the invention.

Various materials may be employed for the parts of the structure shown including wood, metal and plastics. It is desirable that the device be of low bulk and light in weight. It should also be noted that precision accuracy is not required for use in putting. However, it is recognized that the device of the invention may be made in a precision form and may be used in other applications such as in construction levelling machines, levelling appliances and the like where the surface in question has a definite but relatively small slope or pitch.

Having described the invention, what is claimed is:

1. A portable device for measuring the slope of a sloped surface comprising, in combination:

a. a level mount structure having a horizontally disposed elongated central body portion providing a laterally extending upper surface and rotatable wheel means mounted therein enabling said upper surface to be moved over and in immediate proximity to said sloped surface;

b. an elongated tubular handle having one end centrally secured to and extending upwardly from said body portion and being of length sufficient to enable a user to hold an opposite unsecured end thereof and move said level mount structure on said wheel means in immediate proximity to said sloped surface and while walking in an upright position over said sloped surface;

c. an elongated bubble type level secured to said upper sureface of said level mount structure with the axis thereof oriented generally lengthwise of said body portion and perpendicular to the axis of said handle and having a bubble normally centered along a line coinciding with the axis of said handle when said level mount structure is supporting said bubble level in a substantially level position; and d. indicia marks inscribed on said level mount upper surface proximate said bubble level enabling the relative position of said bubble when said mount structure is tilted to be determined in reference to the slope of the portion of said sloped surface immediately below said bubble level.

A device as claimed in claim 1 wherein said body portion provides vertical end surfaces, said wheel means comprises a pair of wheels with one wheel being mounted adjacent each said end surrace, said upper surface and said bubble level are of corresponding downward curvature and said bubble level is recessed in said upper surface.

* * * * *

UNITED STATES PATENT OFFICE
CERTIFICATE OF CORRECTION

Patent No. 3,751,819   Dated August 14, 1973

Inventor(s) Harry F. Dixon

It is certified that error appears in the above-identified patent and that said Letters Patent are hereby corrected as shown below:

Col. 1, line 12, "problesm" should be -problems-

Col. 2, line 3, "suitable" should be -suitably-

Col. 2, line 52, "therin" should be -thereon-

Col. 2, line 64, "sureface" should be -surface-

Col. 4, line 4, "surrace" should be -surface-

Claim 2 is not numbered as Claim 2

Signed and sealed this 30th day of July 1974.

(SEAL)
Attest:

McCOY M. GIBSON, JR.
Attesting Officer

C. MARSHALL DANN
Commissioner of Patents